(12) United States Patent
Nakamura et al.

(10) Patent No.: US 6,894,850 B2
(45) Date of Patent: May 17, 2005

(54) OBJECTIVE LENS DRIVING APPARATUS

(75) Inventors: Keiji Nakamura, Kyoto (JP); Mitoru Yabe, Kyoto (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/336,751

(22) Filed: Jan. 6, 2003

(65) Prior Publication Data

US 2003/0179471 A1 Sep. 25, 2003

(30) Foreign Application Priority Data

Mar. 19, 2002 (JP) ........................................ 2002-075786

(51) Int. Cl.$^7$ .............................. G02B 7/02; G11B 7/00
(52) U.S. Cl. ........................ 359/814; 359/811; 359/813; 359/822; 369/44.11; 369/44.14
(58) Field of Search .............................. 359/814, 811, 359/813, 815, 819, 822, 823, 824; 369/44.11, 44.14, 44.17

(56) References Cited

U.S. PATENT DOCUMENTS

| | | | |
|---|---|---|---|
| 5,062,095 A | 10/1991 | Horikawa et al. | 369/44.21 |
| 5,105,405 A | 4/1992 | Hashimoto et al. | 369/44.22 |
| 5,313,334 A * | 5/1994 | Tomiyama et al. | 359/824 |
| 5,506,732 A | 4/1996 | Mori | 359/824 |
| 5,602,808 A * | 2/1997 | Futagawa et al. | 369/44.14 |
| 5,666,235 A | 9/1997 | Izuka | 359/814 |
| 5,911,847 A | 6/1999 | Suzuki et al. | 156/161 |
| 6,418,094 B1 * | 7/2002 | Ozawa et al. | 369/44.14 |

FOREIGN PATENT DOCUMENTS

| | | |
|---|---|---|
| DE | 197 51 378 A1 | 5/1999 |
| EP | 0460860 | 12/1991 |
| EP | 0 783 119 A1 | 7/1997 |
| JP | 61137235 A | 6/1986 |
| JP | 62239336 A | 10/1987 |
| JP | 63010330 A | 1/1988 |
| JP | 01003831 A | 1/1989 |
| JP | 01192025 A | 8/1989 |
| JP | 02195524 A | 8/1990 |
| JP | 6-79383 B2 | 10/1994 |
| JP | 06325384 A | 11/1994 |
| JP | 09-102134 A | 4/1997 |
| JP | 10-55556 A | 2/1998 |
| JP | 10-143888 A | 5/1998 |
| JP | 2000-020988 A | 1/2000 |

* cited by examiner

*Primary Examiner*—Timothy Thompson
(74) *Attorney, Agent, or Firm*—Birch, Stewart, Kolasch & Birch, LLP.

(57) ABSTRACT

An objective lens driving apparatus includes a lens holder 1 that holds an objective lens 2, and a stationary base 9 that supports the lens holder 1 by a support shaft 3 parallel to an optical axis of the objective lens 2. A stationary yoke 11 and the magnet 8 are mounted to the stationary base 9. A focusing coil 4 and the tracking coils 5a and 5b are mounted to the lens holder 1. The interaction between the current in the focusing coil 4 and the magnetic field caused by the magnet 8 generates an electromagnetic force that moves the lens holder 1 along the support shaft 3. The interaction between the current in the tracking coils 5a and 5b and the magnetic field caused by the magnet 8 generates an electromagnetic force that rotates the lens holder 1 about the support shaft 3.

11 Claims, 12 Drawing Sheets

OBJECTIVE LENS DRIVING APPARATUS

BACKGROUND OF THE INVENTION

The present invention relates to an objective lens driving apparatus used in an optical data recording and reproducing apparatus or the like, for correcting a focusing error and a tracking error of a light spot formed on an optical data recording media such as an optical disk.

In the optical data recording and reproducing apparatus or the like, the data is recorded on and/or reproduced from the optical data recoding media (hereinafter, referred to as a recording media) such as the optical disk. In order to record the data on and/or reproduce the data from the recording media, the focus of an objective lens must be adjusted on a groove or a pit in which the data is recorded, and the light spot must be positioned on a track. Therefore, it is necessary to precisely control the position of the objective lens in the direction parallel to the optical axis of the objective lens and in the direction traversing the track of the recording media. Japanese Provisional Patent publication No. HEI 6-79383 discloses an objective lens driving apparatus for controlling the position of the objective lens.

FIG. 16 shows the objective lens driving apparatus disclosed in the above publication. The objective lens driving apparatus has a lens holder 101 that holds an objective lens 102. The lens holder 101 is supported by a support shaft 107 extending in parallel to the optical axis of the objective lens 102 so that the lens holder 101 is slidable along the support shaft 107 and rotatable about the support shaft 107. A pair of focusing coils 104 and a pair of tracking coils 103 are fixed to the outer surface of the lens holder 101. The focusing coils 104 are symmetrically located with respect to the support shaft 107, and the tracking coils 103 are symmetrically located with respect to the support shaft 107.

An outer yoke 109 and an inner yoke 105 are provided around the lens holder 101. Arc-shaped magnets 106 are fixed to the inner surface of the outer yoke 109. As shown in FIG. 17 in an enlarged scale, each magnet 106 has a focusing magnet portion 106a and a tracking magnet portion 106b. The focusing magnet portion 106a and the tracking magnet portion 106b are divided by a groove 106c formed at an intermediate position of the magnet 106. The focusing magnet portion 106a is polarized in such a manner that the N-pole and the S-pole are arranged in the direction parallel to the support shaft 107. The tracking magnet portion 106b is polarized in the direction perpendicular to the polarization of the focusing magnet portion 106a.

Magnetic pieces 110 are secured to the outer surface of the lens holder 101 in such a manner that each of the magnetic pieces 110 is aligned with a border between the N-pole and the S-pole of the focusing magnetic portion 106a. The magnetic piece 110 is an elongated member extending in the direction parallel to the support shaft 107.

In order to correct the focusing error, current is applied to the focusing coils 104. The interaction between the current and the magnetic field caused by the focusing magnet portions 106a generates an electromagnetic force for moving the lens holder 101 in the direction parallel to the optical axis of the objective lens 102. As a result, the objective lens 102 is moved in the direction parallel to the optical axis thereof, so that the focusing error is corrected. In order to correct the tracking error, current is applied to the tracking coils 103. The interaction between the current and the magnetic field caused by the tracking magnet portions 106b generates an electromagnetic force for rotating the lens holder 101 about the support shaft 107. As a result, the objective lens 102 is moved in the direction traversing the track of the recording media, so that the tracking error is corrected.

As the lens holder 1 moves or rotates, a magnetic attractive force is exerted between the magnetic piece 110 and the focusing magnet portions 106a. With the magnetic attractive force, the lens holder 101 is stably held at a reference position in the direction parallel to the optical axis of the objective lens 102 and a reference position in the direction of the rotation about the support shaft 107.

However, since the above described conventional objective lens driving apparatus uses two kinds of magnet portions respectively for focusing and for tracking, the structure (including a polarization structure) of the magnet becomes complicated, and the number of components increases. Therefore, the conventional objective lens driving apparatus has a problem that the manufacturing cost increases, and the manufacturing process becomes complicated.

Moreover, in the above described conventional objective lens driving apparatus, the lens holder has a backlash because of a gap between a bearing portion of the lens holder 101 and the support shaft 107. Such a backlash of the lens holder 1 may result in tilt and vibration of the objective lens 102.

SUMMARY OF THE INVENTION

This invention is intended to solve the above described problems, and an object of the present invention is to provide an objective lens driving apparatus capable of reducing the manufacturing cost, simplifying the manufacturing process, and restricting the tilt and vibration of the objective lens.

According to the invention, there is provided an objective lens driving apparatus comprising a lens holder (as a movable part) holding the objective lens, and a stationary part. The stationary part supports the lens holder in such a manner that the lens holder is movable in the direction of an optical axis of the objective lens and rotatable about a rotation axis parallel to the optical axis. The objective lens driving apparatus further comprises a magnet mounted to one of the lens holder and the stationary part. The magnet is polarized in the direction toward or away from the rotation axis. The objective lens driving apparatus further comprises a tracking coil and a focusing coil mounted to the other of the lens holder and the stationary part. The tracking coil has a side substantially parallel to the optical axis. The focusing coil has a side substantially perpendicular to the optical axis and to the direction of the polarization of the magnet. The objective lens driving apparatus further comprises a magnetic path forming member that forms a magnetic path in which a magnetic field caused by the magnet passes through the side of the focusing coil and the side of the tracking coil. The objective lens driving apparatus further comprises a current supplying member that supplies current to the focusing coil and the tracking coil. The objective lens driving apparatus further comprises an urging member that generates a magnetic force in combination with the magnet, for urging the lens holder toward a reference position in the direction of the optical axis and in the direction of the rotation of the lens holder.

With such an arrangement, the objective lens can be driven in the focusing direction and in the tracking direction by one kind of magnet, and therefore the number of components can be reduced. Additionally, the magnet having a complicated structure is eliminated, and therefore the cost of the component can be reduced. Accordingly, the manufacturing cost of the objective lens driving apparatus can be reduced, and also the manufacturing process can be simplified. Moreover, the backlash of the lens holder can be restricted by the magnetic force generated by the urging member and the magnet, with the result that tilt and vibration of the objective lens resulting from the backlash is restricted.

DETAILED DESCRIPTION OF THE INVENTION

Embodiments of the invention will be described with reference to the attached drawings.

Embodiment 1.

Figure 1:
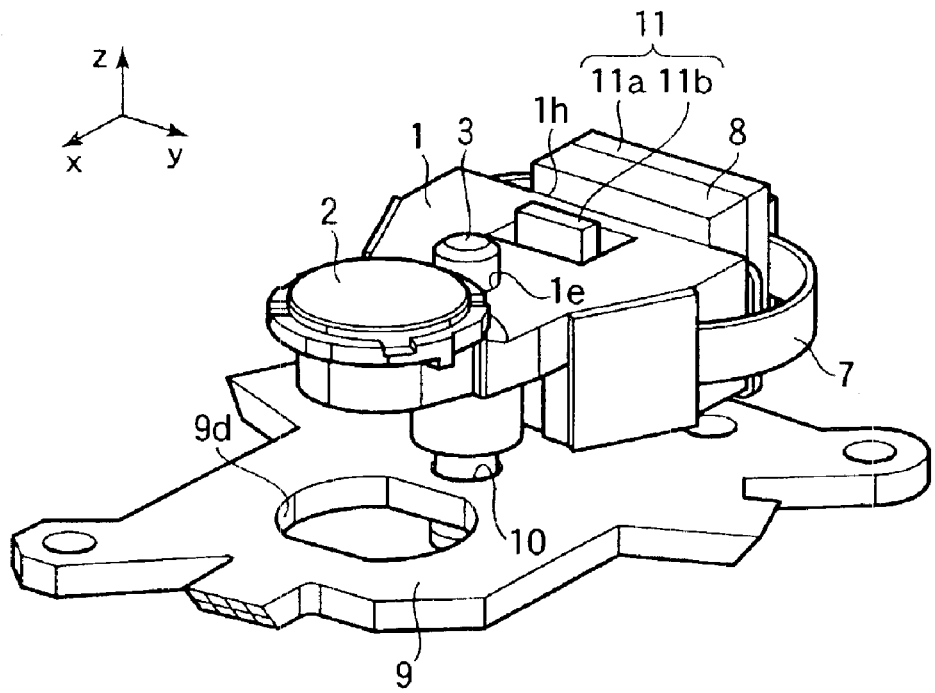
FIG. 1 is a front perspective view of the objective lens driving apparatus according to Embodiment 1 of the present invention, seen from above.
Figure 2:
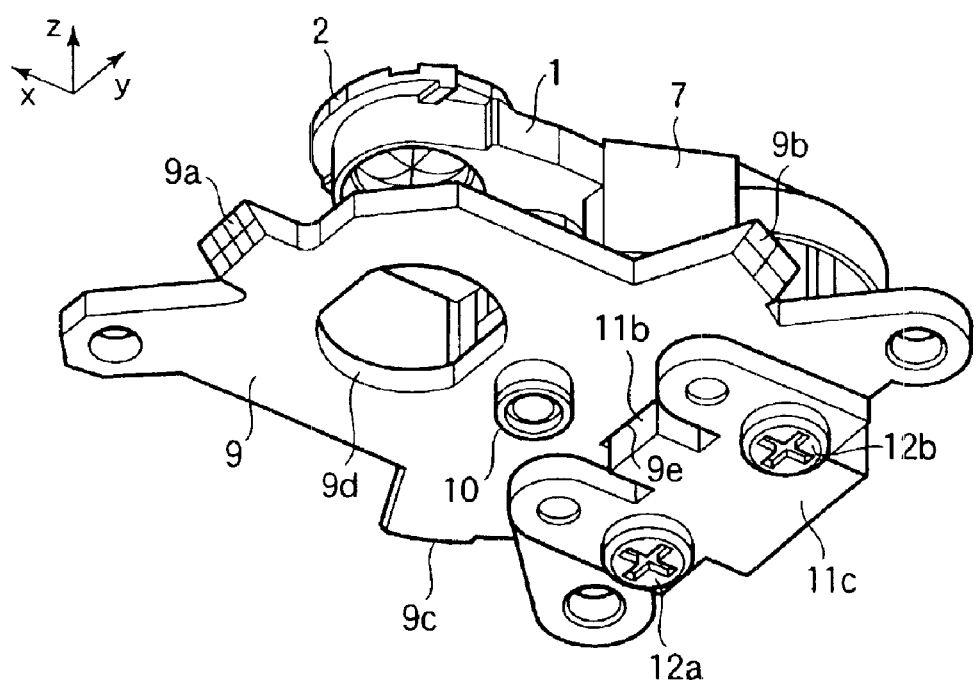
FIG. 2 is a front perspective view of the objective lens driving apparatus according to Embodiment 1 of the present invention, seen from below.
Figure 3:
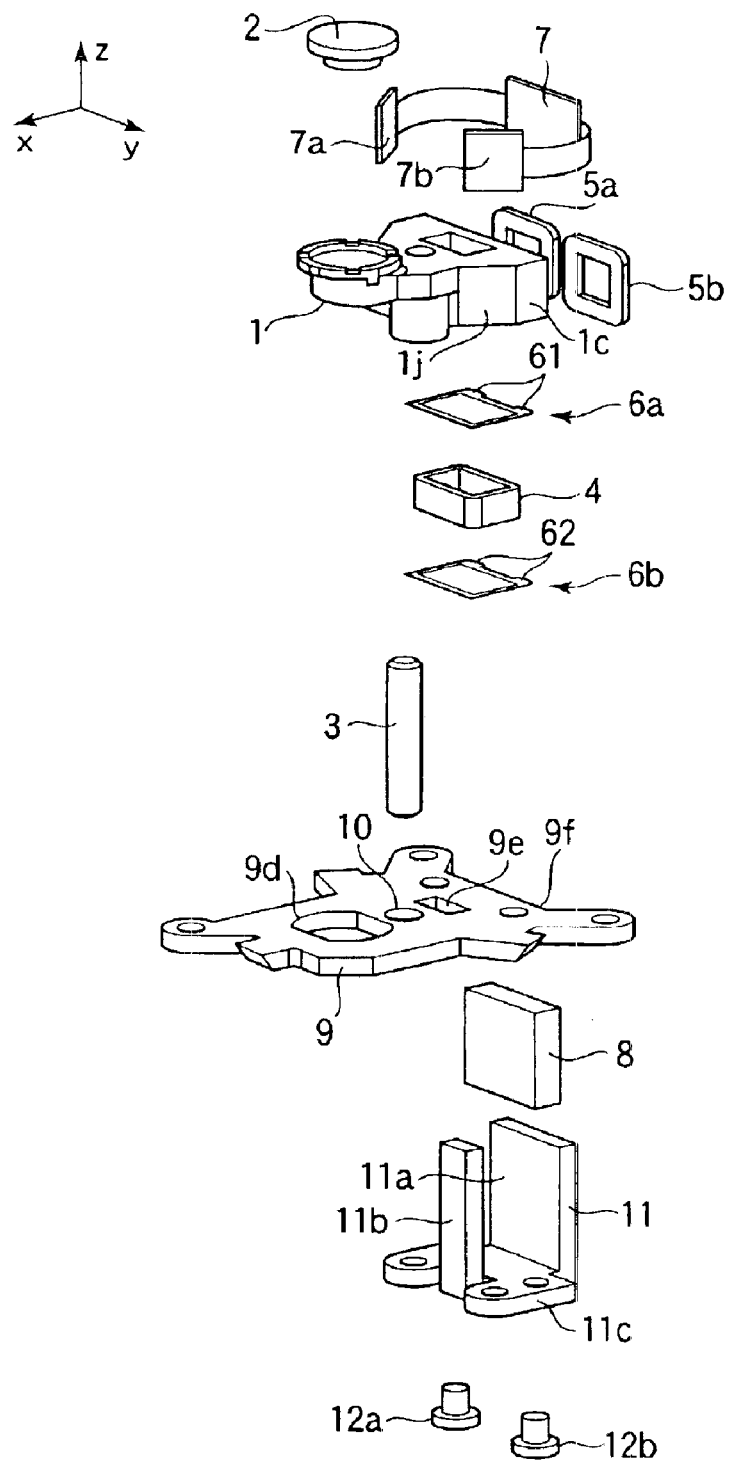
FIG. 3 is an exploded perspective view of the objective lens driving apparatus according to Embodiment 1 of the present invention.
Figure 4:
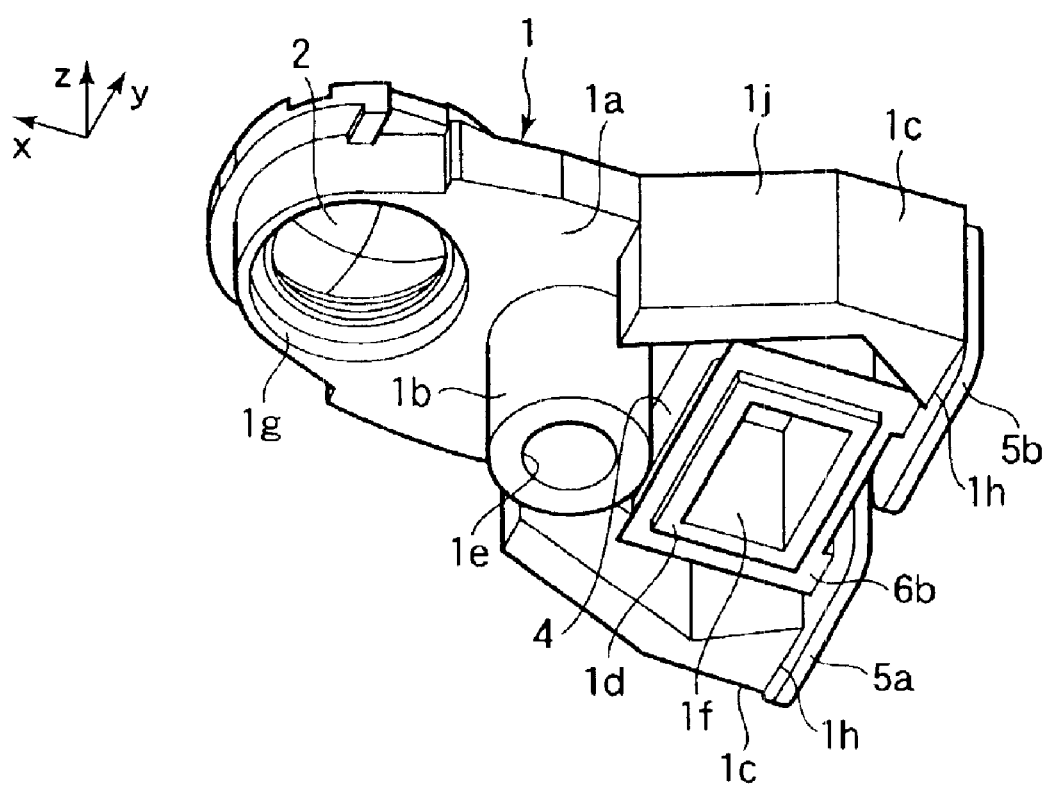
FIG. 4 is a front perspective view of a movable part of the objective lens driving apparatus according to Embodiment 1 of the present invention, seen from below.

FIGS. 1 and 2 are front perspective views of an objective lens driving apparatus according to Embodiment 1 of the present invention, respectively seen from above and seen from below. FIG. 3 is an exploded perspective view of the objective lens driving apparatus according to Embodiment 1. FIG. 4 is a front perspective view of a movable part of the objective lens driving apparatus, seen from below. The objective lens driving apparatus according to Embodiment 1 is mounted to an optical disk drive device (not shown), and includes a lens holder 1 that holds an objective lens 2 and a stationary base (a stationary part) 9 that supports the lens holder 1, as shown in FIG. 1. The lens holder 1 holds the objective lens 2 in such a manner that the direction of the optical axis (z-direction) of the objective lens 2 is perpendicular to the recording surface of the recording media. In the description below, y-direction is used to mean the direction traversing the track of the recording media in xy-plane perpendicular to z-direction. X-direction is used to mean the direction perpendicular to the y-direction in xy-plane.

In the objective lens driving apparatus according to Embodiment 1, the lens holder 1 is supported by the support shaft 3 (forming a rotation axis) fixed to the stationary base 9. The support shaft 3 extends in parallel to the optical axis of the objective lens 2. The lens holder 1 is movable along the support shaft 3, and is rotatable about the support shaft 3. Coils are attached to the lens holder 1, for generating a driving force for moving and rotating the lens holder 1. A magnet 8 and a stationary yoke 11 are provided on the stationary base 9, to form a magnetic circuit. These components will be described in turn.

The stationary base 9 is a plate-shaped member generally elongated in one direction (x-direction). A through hole 10 is formed in the stationary base 9 and is located at a center portion in the longitudinal direction of the stationary base 9. The through hole 10 penetrates the stationary base 9 in the direction parallel to the optical axis of the objective lens 2. The support shaft 3 is fit in the hole 10 by means of press fitting, or adhesion or the like. The support shaft 3 is coated with a low-friction material such as fluorine resin.

As shown in FIG. 2, an opening 9d is formed in the stationary base 9 and is located at an end portion in the longitudinal direction (x-direction) of the stationary base 9. The opening 9d allows the light beam to pass and to enter into the objective lens 2. Further, a rectangular through hole 9e is formed in the stationary base 9 and is located on a part opposite to the opening 9d with respect to the through hole 10. Three spherical surface portions 9a, 9b and 9c are formed on the peripheral edges of the stationary base 9, each of which forms a part of a common spherical surface. The spherical surface portions 9a, 9b and 9c are engaged with a spherical concave formed on a member provided in the optical disk drive device, for adjusting the angle of the stationary base 9, and hence, the tilt of the support shaft 3.

As shown in FIG. 3, a stationary yoke (a magnetic path forming member) 11 is mounted to the stationary base 9. The stationary yoke 11 is made of magnetic material, and includes a first wall portion 11a and a second wall portion 11b extending in parallel to each other. The stationary yoke 11 further includes a plate-shaped bottom portion 11c connecting the bottom ends of the first and second wall portions 11a and 11b. The first and second wall portions 11a and 11b extend in parallel to the support shaft 3, that is, in parallel to the optical axis of the objective lens 2. The bottom portion 11c is fixed to the bottom of the stationary base 9 by means of screws 12a and 12b. In a state in which the bottom portion 11c is fixed to the stationary base 9, the inner surface of the first wall portion 11a faces an end surface 9f of the stationary base 9 formed on an end opposite to the opening 9d, and the second wall portion 11b penetrates the through hole 9e upward, that is, to the lens holder 1 side, and is positioned between the support shaft 3 and the first wall portion 11a.

As shown in FIGS. 1 and 3, a plate-shaped magnet 8 is fixed to the inner surface of the first wall portion 11a. The magnet 8 is polarized in the direction of the thickness of the magnet 8, i.e., in the direction toward or away from the support shaft 3. The magnet 8 faces an end surface 1h (that is, a fixing surface) formed on an end opposite to the objective lens 2 of the lens holder 1.

The lens holder 1 is made of a material that is light in weight and has a high rigidity, such as a plastic material. As shown in FIG. 4, the lens holder 1 has a plate portion 1a generally elongated in one direction (x-direction). A lens mounting portion 1g is formed on the plate portion 1a and is located at an end in the longitudinal direction (x-direction) of the plate portion 1a. Hereinafter, the objective lens 2 side (that is, the lens mounting portion 1g side) of the lens holder 1 is described as "front", and the side opposite to the front side is described as "rear". A cylindrical portion 1b is formed on the plate portion 1a and is located at a center portion in the longitudinal direction of the plate portion 1a. The cylindrical portion 1b is protruded downward, i.e., toward the stationary base 9. The cylindrical portion 1b has a bearing portion 1e constituted by a through hole with a circular cross section.

A pair of downwardly extending wall portions 1c are formed on both side ends of the plate portion 1a, and extend from the center portion to the rear end of the plate portion 1a. An inclined surface 1j is formed in the front half of each wall portion 1c, to which a flexible print circuit board 7 (FIG. 3) is fixed. The rear end surfaces of the wall portions 1c constitute fixing surfaces 1h to which the tracking coils 5a and 5b are fixed. A rectangular portion 1d is formed on the plate portion 1a and is located behind the cylindrical portion 1b. The rectangular portion 1d is protruded downward, that is, toward the stationary base 9. The rectangular portion 1d includes a through hole 1f having a rectangular cross section. The above described second wall portion 11b of the stationary yoke 11 is inserted in the through hole 1f of the rectangular portion 1d.

A focusing coil 4 is wound around the rectangular portion 1d of the lens holder 1 and fixed to the outer surfaces of the rectangular portion 1d. The focusing coil 4 is wound in a rectangular shape in such a manner that the focusing coil 4 has two sides extending in y-direction and two sides extending in x-direction. The focusing coil 4 therefore surrounds the second wall portion 11b inserted in the through hole 1f of the rectangular portion 1d. A part of the focusing coil 4, i.e., one of the sides extending in y-direction, faces the magnet 8 fixed to the first wall portion 11a of the stationary yoke 11.

As was mentioned above, the tracking coils 5a and 5b are fixed to fixing surfaces 1h of the wall portions 1c of the lens holder 1. Each of the tracking coils 5a and 5b is wound in a rectangular shape in such a manner that each of the tracking coils 5a and 5b has two sides extending in y-direction and two sides extending in z-direction. The tracking coils 5a and 5b face the magnet 8 fixed to the wall portion 11a of the stationary yoke 11.

Referring again to FIG. 3, a pair of magnetic plates 6a and 6b (an urging member) having rectangular openings are fixed to the rectangular portion id (FIG. 4) of the lens holder 1. The magnetic plates 6a and 6b vertically sandwich the focusing coil 4. Each of the magnetic plates 6a and 6b is rectangular in a plane (xy-plane) perpendicular to the support shaft 3. The dimension of each of the magnetic plates 6a and 6b in the direction in parallel to the support shaft 3 is sufficiently small relative to the magnet 8. The magnetic plates 6a and 6b are made of magnetic material such as stainless steel or nickel. The magnetic plate 6a has a side that faces the magnet 8, on which two projections 61 are formed. The magnetic plate 6b has a side that faces the magnet 8, on which two projections 62 are formed. The projections 61 and 62 are positioned in hollow portions respectively surrounded by the tracking coils 5a and 5b, and directly face the magnet 8.

The focusing coil 4 and the tracking coils 5a and 5b are electrically connected to a stationary part of the optical disk drive device, by means of the flexible print circuit board 7 (a current supplying member). The flexible print circuit board 7 has two end portions 7a and 7b fixed to the inclined surfaces 1j of the wall portions 1c of the lens holder 1.

Figure 5A:
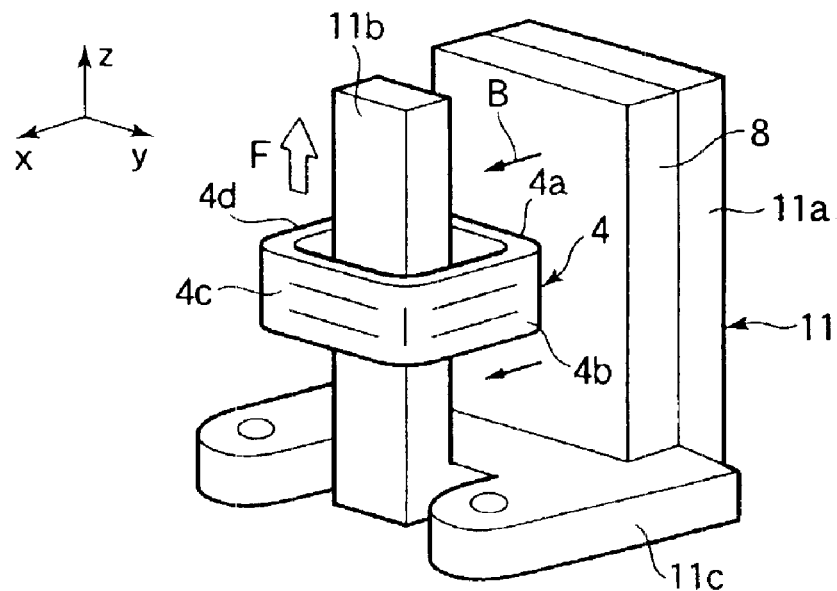
FIG. 5A is a schematic view showing the positional relationship between a focusing coil and a yoke.

FIG. 5A is a schematic diagram showing a positional relationship among the focusing coil 4, the stationary yoke 11 and the magnet 8. As shown in FIG. 5A, the focusing coil 4 has sides 4a and 4c extending in y-direction and sides 4b and 4d extending in x-direction. Between the magnet 8 and the second wall portion 11b of the stationary yoke 11, a magnetic field B is generated in the direction of the polarization of the magnet 8, that is, the direction toward or away from the support shaft 3. The side 4a of the focusing coil 4 is positioned in the magnetic field B. The current flowing in the side 4a and the magnetic field B are perpendicular to each other, generating the electromagnetic force F in the direction along the support shaft 3, that is, the direction in parallel to the optical axis of the objective lens 2.

Figure 5B:
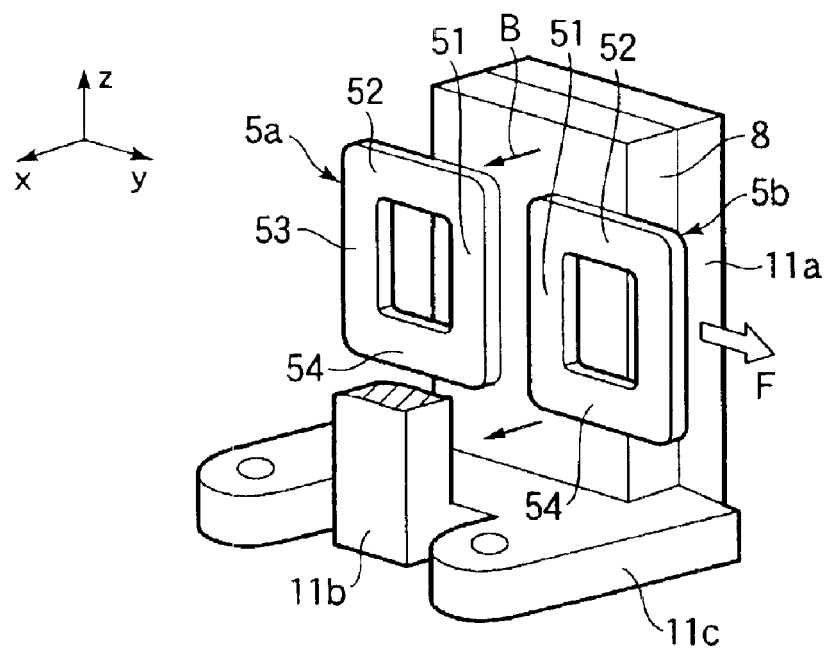
FIG. 5B is a schematic view showing the positional relationship between tracking coils and the yoke.

FIG. 5B is a schematic diagram showing a positional relationship among the tracking coils 5a and 5b, the stationary yoke 11 and the magnet 8. As shown in FIG. 5B, each of the tracking coils 5a and 5b has sides 51 and 53 extending in z-direction and sides 52 and 54 extending in y-direction. The side 51 of the tracking coil 5a and the side 51 of the tracking coil 5b are positioned in the magnetic field B. The current flowing in the sides 51 and the magnetic field B are perpendicular to each other, generating the electromagnetic force F in the direction of the rotation of the lens holder 1 about the support shaft 3.

The method for correcting the focusing error is described. In order to correct the focusing error, current is applied to the focusing coil 4. The interaction between the current and the magnetic field caused by the magnet 8 generates the electromagnetic force, which moves the lens holder 1 along the support shaft 3. By controlling the position of the lens holder 1 in the direction along the support shaft 3, the distance between the objective lens 2 and the recording media is adjusted, so that the focusing error is corrected.

The movement of the lens holder 1 changes the magnetic field between the magnetic plates 6a and 6b and the magnet 8. As a result, a restoring force is generated according to the displacement of the lens holder 1, and urges the lens holder 1 to a position where the lens holder 1 is stably held. In the direction of the movement of the lens holder 1, the magnetic flux density is maximum at the center of the magnet 8, so that the lens holder 1 is stably held when both of the magnetic plates 6a and 6b are the closest to the center of the magnet 8. Accordingly, when the current in the focusing coil 4 is stopped, the lens holder 1 is moved to a position where both of the magnetic plates 6a and 6b are at equal distance from the magnet 8. This position is referred to as a reference position in the direction of the support shaft 3. The shape and thickness of the magnetic plates 6a and 6b are determined in such a manner that a linear property is obtained in the range (generally, approximately within ±0.5 mm) of the correction of the focusing error of the objective lens 2. The linear property means a property that the restoring force is proportional to the displacement of the lens holder 1 from the reference position.

Next, the method for correcting the tracking error is described. In order to correct the tracking error, current is applied to the tracking coils 5a and 5b. The interaction between the current and the magnetic field caused by the magnet 8 generates the electromagnetic force, which rotates the lens holder 1 about the support shaft 3. By rotating the lens holder 1, the objective lens 2 is moved in the direction traversing the track of the recording media, so that the tracking error is corrected.

The rotation of the lens holder 1 changes the magnetic field between the magnetic plates 6a and 6b and the magnet 8. As a result, a restoring force is generated according to the amount of rotation of the lens holder 1. The magnetic plates 6a and 6b are stably held when the distances from the respective projections 61 to the magnet 8 are equal to each other, and the distances from the respective projections 62 to the magnet 8 are equal to each other. Thus, when the distances from the respective projections 61 (62) to the magnet 8 becomes unequal to each other, the restoring force is generated to urge the lens holder 1 to a position where the distances from the respective projections 61 (62) to the magnet 8 are equal to each other. Accordingly, when the current in the tracking coils 5a and 5b is stopped, the lens holder 1 is rotated to a position where the distances from the respective projections 61 (62) to the magnet 8 becomes equal to each other. This position is referred to as a reference position in the direction of the rotation. The shape and thickness of the magnetic plates 6a and 6b are determined in such a manner that the linear property is obtained in the range (generally, approximately within ±0.5 mm) of the correction of the tracking error of the objective lens 2.

In addition to the restoring force described above, an attractive magnetic force is exerted between the magnet 8 and the magnetic plates 6a and 6b. Thus, the lens holder 1 is urged in the direction in which the bearing portion 1e of the lens holder 1 abuts against the support shaft 3. Thus, the backlash of the lens holder 1 resulting from the gap between the bearing portion 1e and the support shaft 3 is restricted. Therefore, tilt and vibration resulting from the backlash of the lens holder 1 is restricted.

As described above, according to Embodiment 1, a single kind of magnet provides the driving force of the lens holder 1 in the focusing direction and the tracking direction. Since it is not necessary to use a plurality of magnets polarized in a plurality of directions, the number of the components can be reduced. In addition, since it is not necessary to use a magnet having a complicated structure, the cost of the component can be reduced. Accordingly, the manufacturing cost of the objective lens driving apparatus can be reduced, and the manufacturing process of the objective lens driving apparatus can be simplified.

Moreover, the attractive magnetic force exerted between the magnet 8 and the magnetic plates 6a and 6b restricts the backlash of the lens holder 1 resulting from the gap between the support shaft 3 and the bearing portion 1e of the lens holder 1. As a result, tilt and vibration of the objective lens 2 can be restricted. The magnetic plates 6a and 6b are also used to generate a restoring force for urging the lens holder 1 to the reference position.

Additionally, the focusing coil 4 and the tracking coils 5a and 5b are located on a part opposite to the objective lens 2 with respect to the support shaft 3, so that the size of the focusing coil 4 can be reduced. Thus, of the total length of the focusing coil 4, the length of the part contributing to the generation of the driving force can be increased. As a result, the lens holder 1 can be moved and rotated with a relatively small electric power.

Furthermore, since the first wall portion 11a and the second wall portion 11b of the stationary yoke 11 are formed to sandwich the focusing coil 4, the tracking coils 5a and 5b and the magnet 8 therebetween, the sufficient magnetic field can be exerted on the focusing coil 4 and the tracking coils 5a and 5b.

Embodiment 2.

Figure 6:
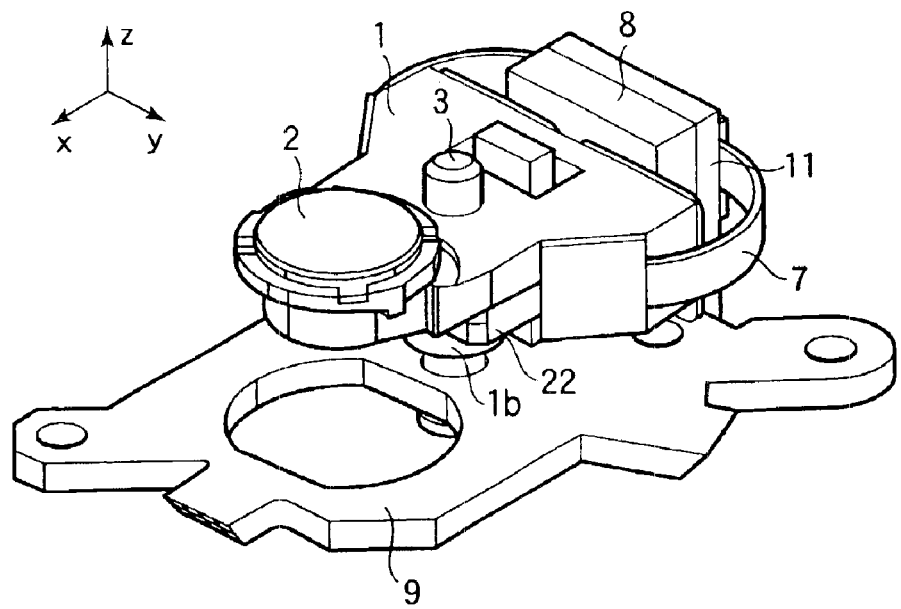
FIG. 6 is a front perspective view of the objective lens driving apparatus according to Embodiment 2 of the present invention, seen from above.
Figure 7:
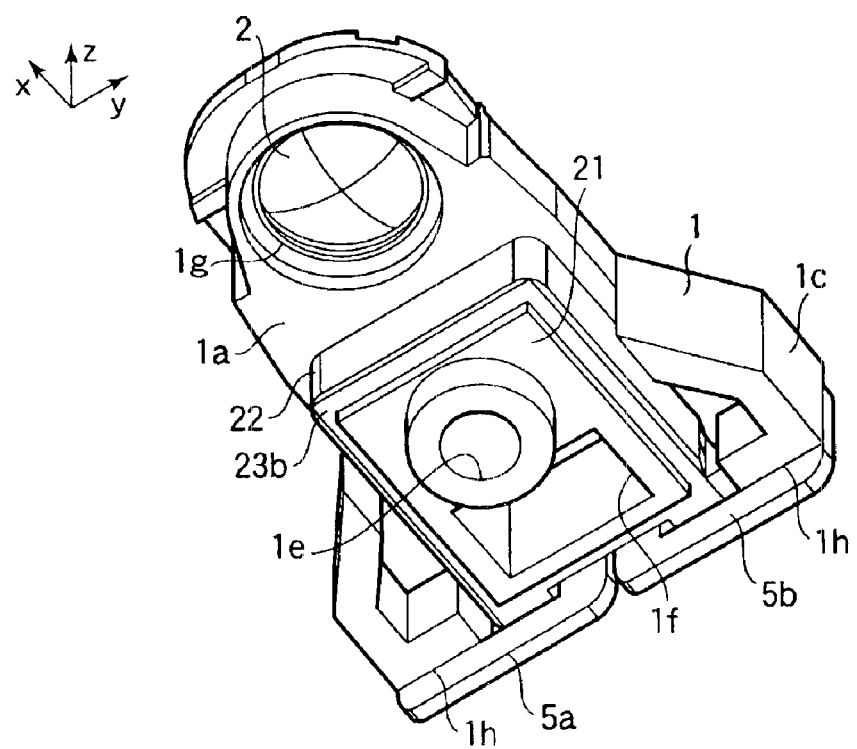
FIG. 7 is a front perspective view of a movable part of the objective lens driving apparatus according to Embodiment 2 of the present invention, seen from below.
Figure 8:
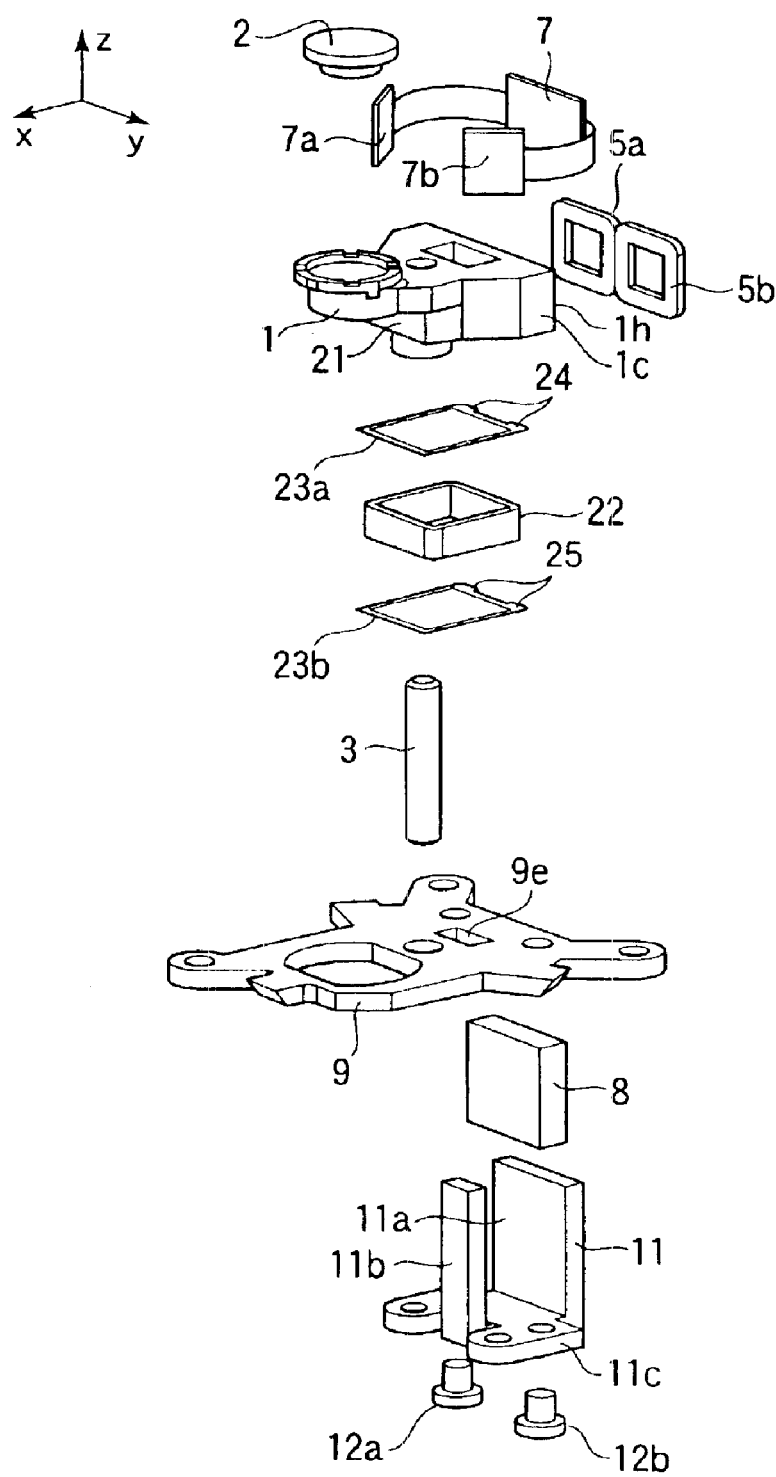
FIG. 8 is an exploded perspective view of the objective lens driving apparatus according to Embodiment 2 of the present invention.

FIG. 6 is a front perspective view of an objective lens driving apparatus according to Embodiment 2, seen from above. FIG. 7 is a front perspective view of a movable part of the objective lens driving apparatus according to Embodiment 2, seen from below. FIG. 8 is an exploded perspective view of the objective lens driving apparatus according to Embodiment 2. In FIGS. 6 to 8, the components that are the same as or correspond to the components shown in FIGS. 1 to 3 are assigned the same reference numerals. As shown in FIG. 6, the structure of the lens holder 1 of Embodiment 2 is different from that of Embodiment 1. The structures of the stationary base 9 and the stationary yoke 11 are the same as those of Embodiment 1.

As shown in FIG. 7, the lens holder 1 has a generally elongated plate portion 1a having a lens mounting portion 1g formed at an end in the longitudinal direction thereof, as in Embodiment 1. Wall portions 1c are formed on both side ends of the plate portion 1a, as in Embodiment 1. A rectangular portion 21 is protruded downward toward the stationary base 9 from the plate portion 1a. The rectangular portion 21 extends in the longitudinal direction of the plate portion 1a from the center portion to the rear end of the plate portion 1a. The bearing portion 1e and the through hole 1f described in Embodiment 1 are formed in the rectangular portion 21.

The focusing coil 22 is wound around the rectangular portion 21 and fixed to the outer surfaces of the rectangular portion 21 in such a manner that the focusing coil 22 has two sides extending in x-direction and two sides extending in y-direction. That is, the focusing coil 22 surrounds the support shaft 3 (FIG. 8) inserted in the bearing portion 1e and the second wall portion 11b (FIG. 8) inserted in the through hole 1f. Tracking coils 5a and 5b are fixed to the fixing surfaces 1h, that is, the rear end surfaces of the wall portions 1c, as in Embodiment 1.

As shown in FIG. 8, a pair of magnetic plates 23a and 23b are fixed to the rectangular portion 21 in such a manner that the magnetic plates 23a and 23b vertically sandwich the focusing coil 22 therebetween. The magnetic plates 23a and 23b are made of magnetic material such as stainless steel or nickel. The magnetic plate 23a has a side that faces the magnet 8, on which two projections 24 are formed. The magnetic plate 23b has a side that faces the magnet 8, on which two projections 25 are formed. The projections 24 and 25 are positioned in hollow portions respectively surrounded by the tracking coils 5a and 5b fixed to the fixing surface 1h of the lens holder 1, and directly face the magnet 8. Other structure and operation of the objective lens driving apparatus of Embodiment 2 are the same as those of Embodiment 1.

As constructed above, according to Embodiment 2, the longitudinal size of the lens holder 1 can be reduced. Thus, the size and weight of the movable part of the objective lens driving apparatus can be reduced. Therefore, in addition to the advantages of Embodiment 1, the electric power for operating the objective lens driving apparatus can be further reduced.

Embodiment 3.

Figure 9:
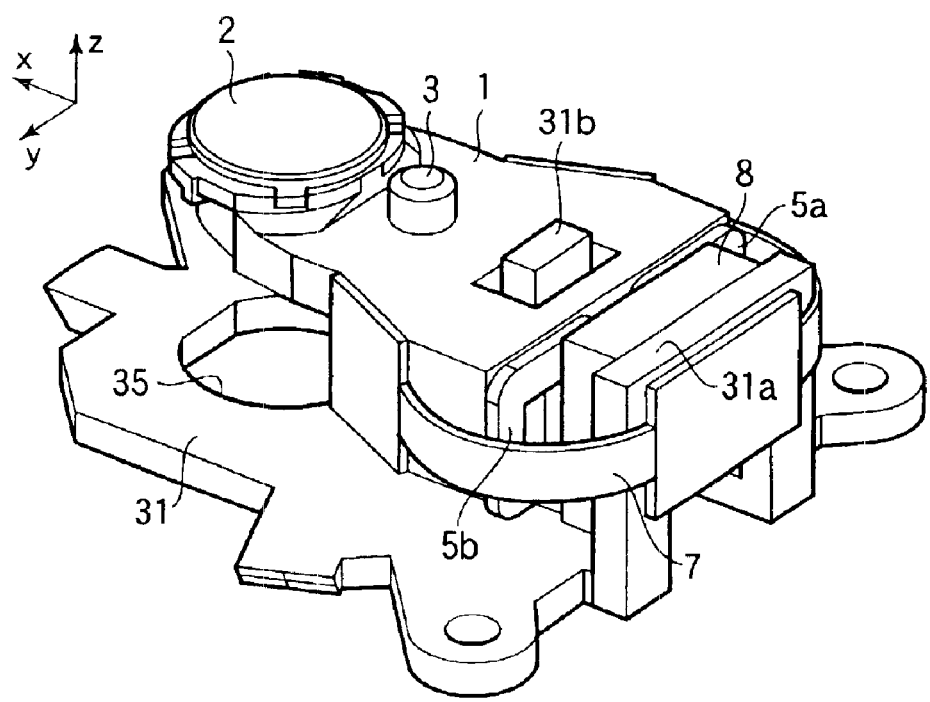
FIG. 9 is a rear perspective view of the objective lens driving apparatus according to Embodiment 3 of the present invention, seen from above.
Figure 10:
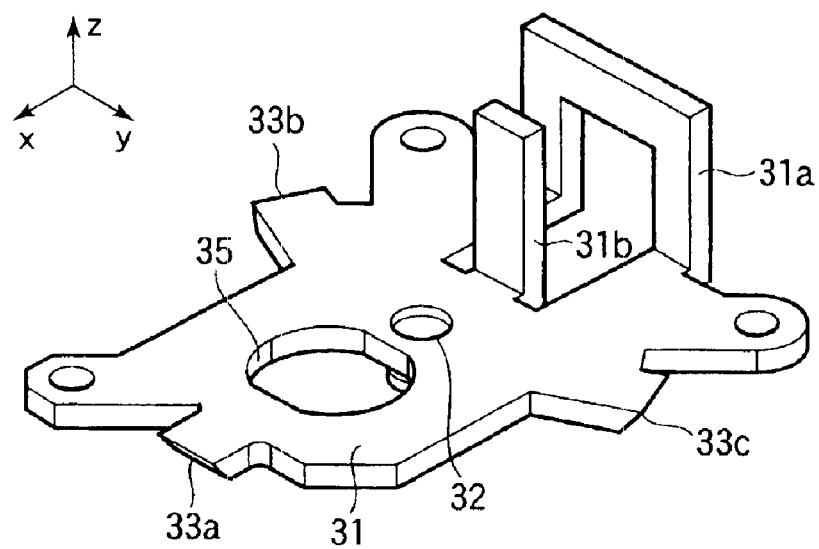
FIG. 10 is a front perspective view of a stationary base of the objective lens driving apparatus according to Embodiment 3 of the present invention, seen from above.
Figure 11:
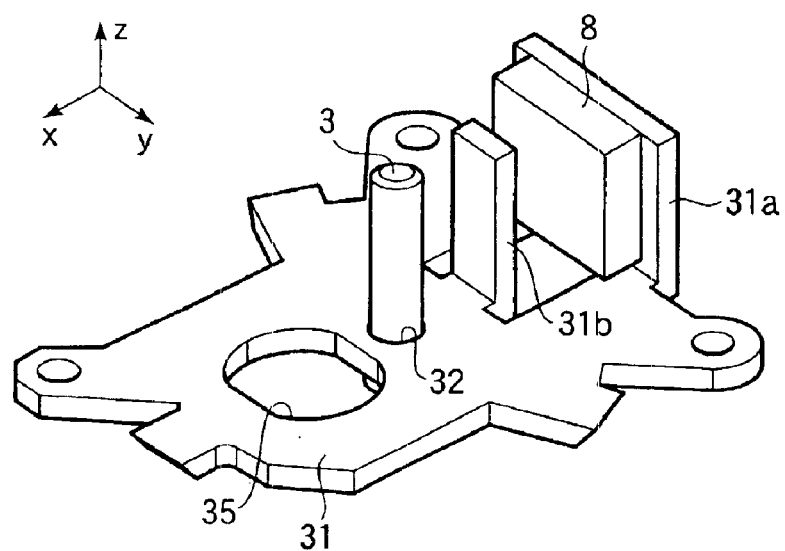
FIG. 11 is a front perspective view of a stationary part including the stationary base of the objective lens driving apparatus according to Embodiment 3 of the present invention, seen from above.

FIG. 9 is a rear perspective view of an objective lens driving apparatus according to Embodiment 3, seen from above. FIG. 10 is a front perspective view of a stationary base according to Embodiment 3, seen from above. FIG. 11 is a front perspective view of a stationary part including the stationary base shown in FIG. 10, seen from above. In FIGS. 9 to 11, the components that are the same as or correspond to the components shown in FIGS. 1 to 3 are assigned the same reference numerals.

In Embodiments 1 and 2 described above, the stationary base 9 and the stationary yoke 11 are separate with each other (FIG. 3). In contrast, in Embodiment 3, a stationary base 31 includes a part that functions as the stationary yoke, as shown in FIG. 9. The stationary base 31 shown in FIG. 10 is generally elongated and is made of magnetic material. A through hole 32 is formed in the stationary base 31, and is located at a center portion in the longitudinal direction of the stationary base 31. The through hole 32 penetrates the stationary base 31 in the direction parallel to the optical axis of the objective lens 2. The support shaft 3 (FIG. 11) is fit in the through hole 32 by means of press fitting, adhesion or the like.

An opening 35 is formed in the stationary base 31, and is located at an end in the longitudinal direction of the stationary base 31. The opening 35 allows the light beam to pass and to enter into the objective lens 2. A pair of wall portions 31a and 31b are formed on the stationary base 31, and are located on a part opposite to the opening 35 with respective to the support shaft 3. The wall portions 31a and 31b extend in parallel to the support shaft 3. The first wall portion 31a is located on an end opposite to the opening 35 with respect to the support shaft 3 of the stationary base 31. The second wall portion 31b is located between the support shaft 3 and the first wall portion 31a. Three spherical surface portions 33a, 33b and 33c are formed on the peripheral edges of the stationary base 31, each of which forms apart of a common sphere. The function of the spherical surface portions 33a, 33b and 33c is the same as that of the spherical surface portions 9a, 9b and 9c of Embodiment 1.

As shown in FIG. 11, a plate-shaped magnet 8 is fixed to the inner surface of the first wall portion 31a of the stationary base 31. The magnet 8 is polarized in the direction of the thickness thereof and in the direction toward or away from the support shaft 3. As in Embodiment 1, the side 4a (FIG. 5B) of the focusing coil 4 and the sides 51 (FIG. 5B) of the tracking coils 5a and 5b are positioned in the magnetic field caused by the magnet 8. The interaction between the current and the magnetic field generates the driving force for moving the lens holder 1 along the support shaft 3 and rotating the lens holder 1 about the support shaft 3. Other structure and operation of the objective lens driving apparatus of Embodiment 3 are the same as those of the objective lens driving apparatus of Embodiment 1.

As constructed above, according to Embodiment 3, the stationary base 31 also functions as the stationary yoke, and therefore it is not necessary to provide a separate stationary yoke. Accordingly, in addition to the advantages of Embodiment 1, the manufacturing cost of the objective lens drive apparatus can be further reduced.

Embodiment 4.

Figure 12:
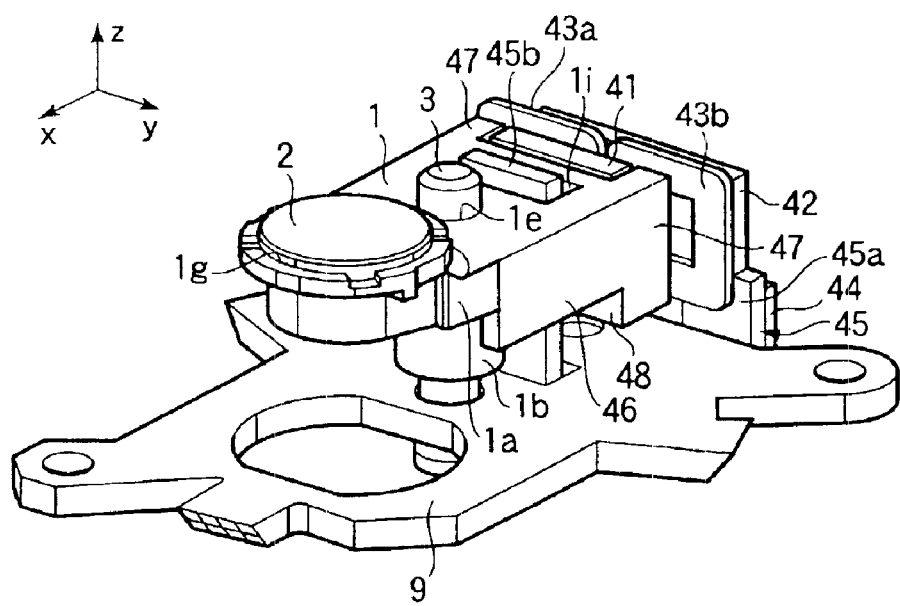
FIG. 12 is a front perspective view of the objective lens driving apparatus according to Embodiment 4 of the present invention, seen from above.
Figure 13:
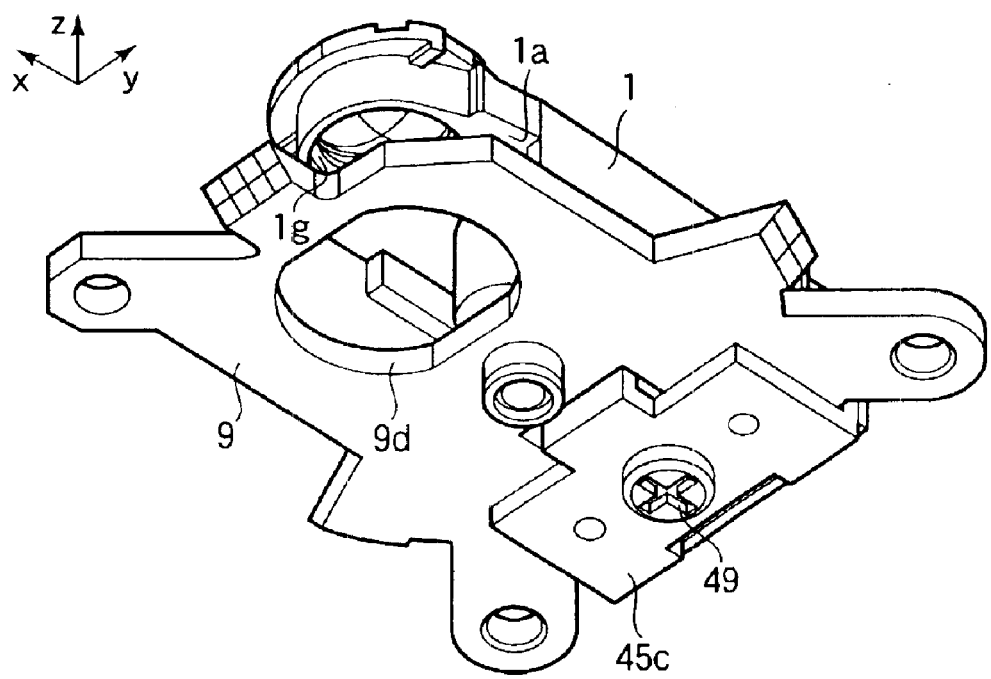
FIG. 13 is a front perspective view of the objective lens driving apparatus according to Embodiment 4 of the present invention, seen from below.
Figure 14:
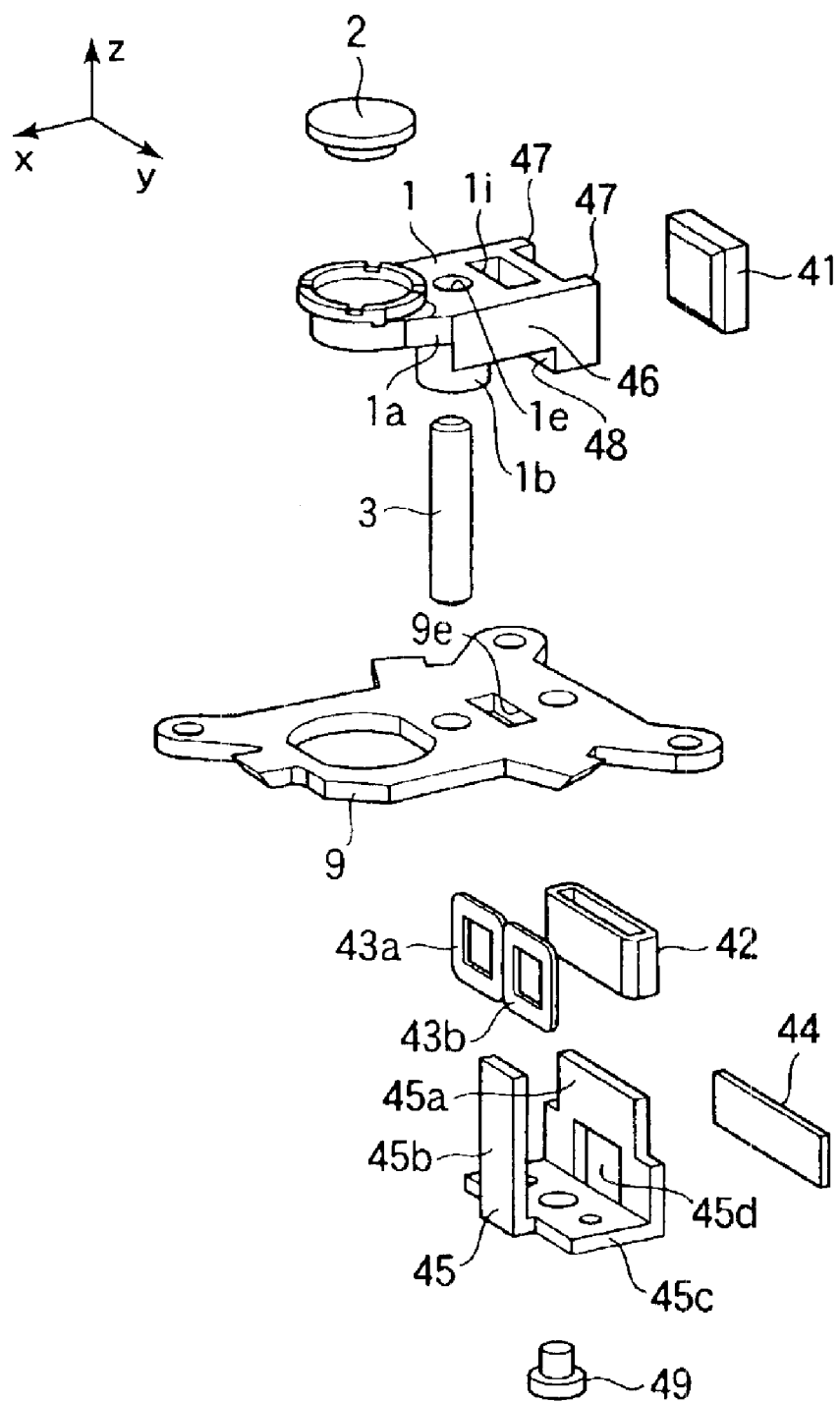
FIG. 14 is an exploded perspective view of the objective lens driving apparatus according to Embodiment 4 of the present invention.

FIGS. 12 and 13 are front perspective views of an objective lens driving apparatus, respectively seen from above and seen from below. FIG. 14 is an exploded perspective view of the objective lens driving apparatus according to Embodiment 4. In FIGS. 12 to 14, the components that are the same as or correspond to the components shown in FIGS. 1 to 3 are assigned the same reference numerals.

In Embodiments 1 to 3 described above, the magnet is fixed to the stationary base directly or via the stationary yoke. In contrast, in Embodiment 4, a magnet 41 is fixed to the lens holder 1 as shown in FIG. 12.

In Embodiment 4, the lens holder 1 includes a generally elongated plate portion 1a, as in Embodiment 1. The plate portion 1a has a cylindrical portion 1b formed at a center portion in the longitudinal direction thereof, and a lens mounting portion 1g formed at an end in the longitudinal direction thereof. The objective lens 2 side (that is, the lens mounting portion 1g side) of the lens holder 1 is described as "front", and the side opposite to the front side is described as "rear", as in Embodiment 1. A rectangular through hole 1i is formed in the plate portion 1a, and is located behind the cylindrical portion 1b. In this through hole 1i, a second wall portion 45b of a stationary yoke 45 (described later) is inserted. A pair of wall portions 46 are formed on both sides in the width direction of the plate portion 1a. Unlike Embodiment 1, the wall portions 46 do not have surfaces for fixing the flexible print circuit board. A pair of wall portions 47 extend rearward from the rear ends of the wall portions 46, and supports the magnet 41. Another wall portion 48 extends in the width direction of the lens holder 1, on the front side of the magnet 41. The magnet 41 is held in a space between the wall portions 47, in such a manner that the polarization of the magnet 41 is in the direction toward or away from the support shaft 3.

The stationary yoke 45 is made of magnetic material, and includes a first wall portion 45a, a second wall portion 45b and a bottom portion 45c, as shown in FIG. 14. The first wall portion 45a and the second wall portion 45b face each other, and are connected by the bottom portion 45c. The bottom portion 45c is fixed to the stationary base 9 by means of a screw 49. The first wall portion 45a faces the magnet 41 supported by the wall portions 47 at the rear end of the lens holder 1. The second wall portion 45b is inserted in the through hole 1i formed in the rectangular portion 1a of the lens holder 1.

The focusing coil 42 is wound around the upper part of the first wall portion 45a of the stationary yoke 45 in such a manner that the focusing coil 42 has two short sides extending in x-direction and two sides extending in y-direction. Tracking coils 43a and 43b are mounted on the focusing coil 4. Each of the tracking coils 43a and 43b is wound in a rectangular shape in such a manner that each of the tracking coils 43a and 43b has two sides extending in y-direction and two sides extending in z-direction.

Figure 15A:
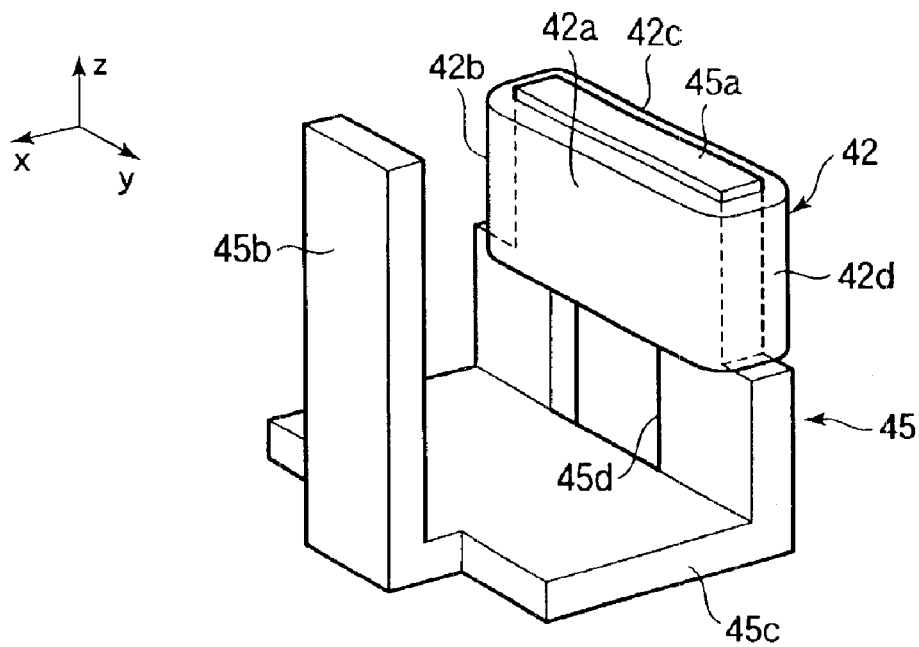
FIG. 15A is a schematic view showing the positional relationship between a focusing coil and a yoke.

FIG. 15A is a schematic view showing a positional relationship between the focusing coil 42 and the stationary yoke 45. The focusing coil 42 has two sides 42a and 42c extending in y-direction, and two sides 42b and 42d extending in x-direction. The magnet 41 (FIG. 14) and the stationary yoke 45 form a magnetic path, so that a magnetic field is generated in a space between the magnet 41 and the first wall portion 45a of the stationary yoke 45. The direction of the magnetic flux of the magnetic field is the same as the direction of the polarization of the magnet 41, that is, the direction toward or away from the support shaft 3. The side 42a of the focusing coil 42 is positioned in this magnetic field. The interaction between the current in the side 42a and the magnetic field generates the electromagnetic force in the direction of moving the lens holder 1 along the support shaft 3.

Figure 15B:
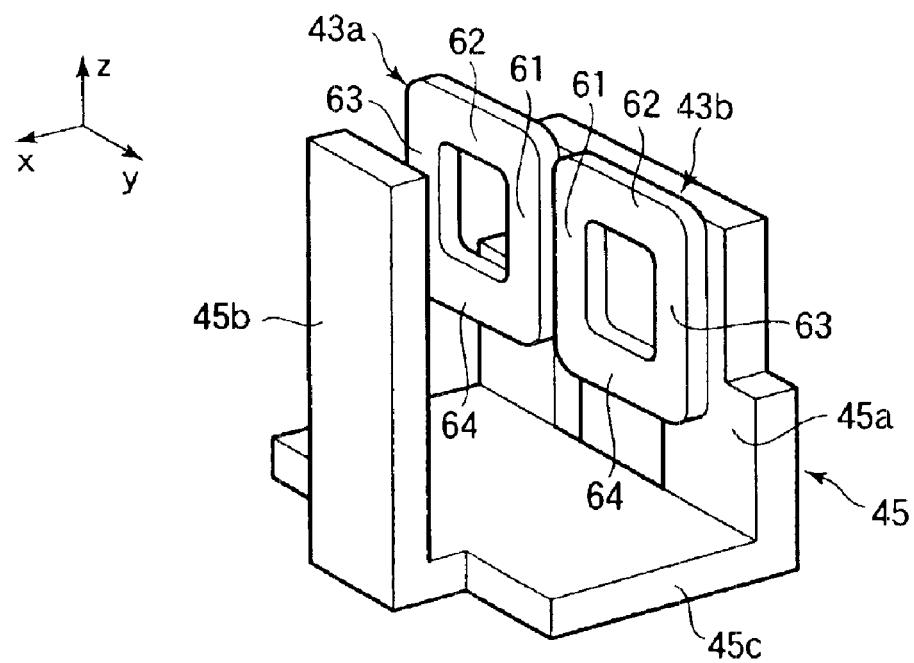
FIG. 15B is a schematic view showing the positional relationship between tracking coils and a yoke.
Figure 16:
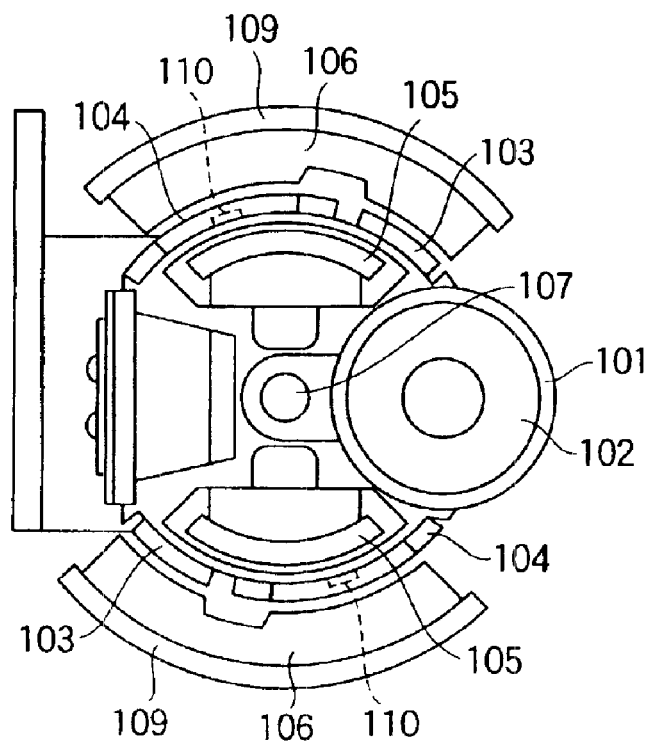
FIG. 16 is a plan view of a conventional objective lens driving apparatus.
Figure 17:
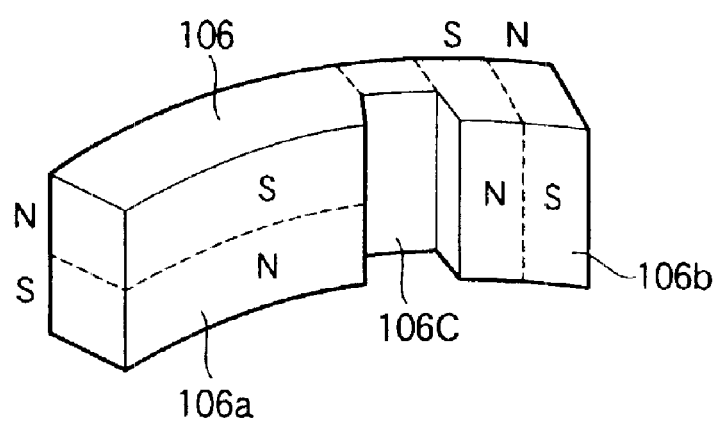
FIG. 17 is a perspective view of a magnet of the conventional objective lens driving apparatus.

FIG. 15B is a schematic view showing a positional relationship between the tracking coil 43a and 43b and the stationary yoke 45. Each of the tracking coils 43a and 43b has two sides 61 and 63 extending in z-direction and two sides 62 and 64 extending in y-direction. The sides 61 of the tracking coils 43a and 43b are positioned in the magnetic field between the magnet 41 (FIG. 14) and the first wall portion 45a of the stationary yoke 45. The interaction between the current in the sides 61 and the magnetic field generates the electromagnetic force in the direction of rotating the lens holder 1 about the support shaft 3.

In order to correct the focusing error, current is applied to the focusing coil 42. The interaction between the current and the magnetic field caused by the magnet 41 generates the electromagnetic force for moving the lens holder 1 along the support shaft 3. By controlling the position of the lens holder 1 in the direction along the support shaft 3, the distance between the objective lens 2 and the recording media is adjusted, so that the focusing error is corrected.

The magnet 41 faces a cut-away portion 45d formed in the first wall portion 45a of the stationary yoke 45. The movement of the lens holder 1 causes a change in the magnetic field between the magnet 41 and the first wall portion 45a of the stationary yoke 45, so that a magnetic restoring force is generated according to the displacement of the lens holder 1. The shape of the cut-away portion 45d is determined in such a manner that the linear property is obtained in the range (generally, approximately within ±0.5 mm) of the correction of the focusing error of the objective lens 2. Further, the length of the cut-away portion 45d in the direction of the optical axis of the objective lens 2 needs to be greater than the range of movement of the lens holder 1 for correcting the focusing error.

In order to correct the tracking error, current is applied to the tracking coils 5a and 5b. The interaction between the current and the magnetic field caused by the magnet 41 generates the electromagnetic force for rotating the lens holder 1 about the support shaft 3. The tracking error is corrected by controlling the position of the lens holder 1 in the direction traversing the track line of the recording media.

The rotation of the lens holder 1 causes a change in the magnetic field between the magnet 41 and the first wall portion 45a of the stationary yoke 45, so that a magnetic restoring force is generated according to the amount of rotation of the lens holder 1. The shape of the cut-away portion 45d is determined in such a manner that the linear property is obtained in the range (generally, approximately within ±0.5 mm) of the correction of the tracking error of the objective lens 2.

In addition to the restoring force described above, an attractive magnetic force is exerted between the first wall portion 45a of the stationary yoke 45 and the magnet 41. As a result, the bearing portion 1e of the lens holder 1 abuts against the support shaft 3, so that the backlash of the lens holder 1 resulting from the gap between the bearing portion 1e and the support shaft 3 is restricted.

As constructed above, according to Embodiment 4, in the objective lens driving apparatus having the movable magnet, the manufacturing cost of the lens driving apparatus can be reduced, and therefore the manufacturing process can be simplified.

In Embodiment 4, the stationary base 9 and the stationary yoke 45 are separately provided. However, it is possible that the stationary base is made to have a function as the stationary yoke. In other word, the stationary base and the stationary yoke can be unitarily formed.

While the preferred embodiments of the present invention have been illustrated in detail, it should be apparent that modifications and improvements may be made to the invention without departing from the spirit and scope of the invention as described in the following claims.

What is claimed is:

1. An objective lens driving apparatus comprising:
   a lens holder as a movable part, which holds an objective lens;
   a stationary part that supports said lens holder in such a manner that said lens holder is movable in the direction of an optical axis of said objective lens and rotatable about a rotation axis parallel to said optical axis;
   a magnet mounted to one of said lens holder and said stationary parts said magnet being polarized in the direction toward or away from said rotation axis;
   a tracking coil and a focusing coil mounted to the other of said lens holder and said stationary part, said tracking coil having a side substantially parallel to said optical axis, and said focusing coil having a side substantially perpendicular to said optical axis and to said direction of polarization of said magnet;
   a magnetic path forming member that forms a magnetic path in which a magnetic field caused by said magnet passes through said side of said focusing coil and said side of said tracking coil;
   a current supplying member that supplies current to said focusing coil and said tracking coil; and
   an urging member causing a magnetic force in combination with said magnet, for urging said lens holder toward a reference position in the direction of said optical axis and in the direction of the rotation of said lens holder,
   wherein said tracking coil and at least a portion of said focusing coil are located on a part opposite to said objective lens with respect to said rotation axis of said lens holder.

2. The objective lens driving apparatus as set forth in claim 1, wherein said magnet is mounted to said lens holder, said focusing coil and said tracking coil are mounted to said stationary part.

3. The objective lens driving apparatus as set forth in claim 2, wherein said magnetic path forming member includes a portion that functions as said urging member.

4. The objective lens driving apparatus as set forth in claim 1, wherein said stationary part is made of magnetic material, and includes a portion that functions as said magnetic path forming member.

5. The objective lens driving apparatus as set forth in claim 1, wherein said magnetic path forming member comprises a yoke provided in said stationary part, and said yoke has a pair of wall portions formed in such a manner that said magnet, said side of said focusing coil and said side of said tracking coil are located between said wall portions.

6. The objective lens driving device of claim 1, wherein said magnet is polarized substantially in the direction toward or away from the objective lens when the lens holder is in the reference position.

7. The objective lens driving apparatus as set forth in claim 1, wherein said magnet is mounted to said stationary part, and said focusing coil and said tracking coil are mounted to said lens holder.

8. The objective lens driving apparatus as set forth in claim 7, wherein said urging member comprises a magnetic body mounted to said lens holder, and said magnetic force is exerted between said magnet and said magnetic body.

9. The objective lens driving apparatus as set forth in claim 7, wherein said focusing coil is mounted to said lens holder in such a manner that said focusing coil surrounds said rotation axis of said lens holder, and said tracking coil is located on a part opposite to said objective lens with respect to said rotation axis of said lens holder.

10. An objective lens driving apparatus comprising:
   a lens holder configured to hold an objective lens, the lens holder being operable to move in a direction parallel to an optical axis of the objective lens, and to rotate about a rotation axis;
   a stationary part configured to support the lens holder;
   a tracking coil operably attached to one of the lens holder and the stationary part, the tracking coil being configured to conduct a current flowing substantially parallel to said optical axis;
   a magnet operably attached to the one of the lens holder and the stationary part not operably attached to the tracking coil, the magnet being polarized in a single direction to produce a magnetic field in relation to the current flowing through the tracking coil, such that the magnetic field is sufficient to rotate the lens holder about the rotation axis without the use of another magnet, thereby correcting a tracking error of the objective lens; and
   a focusing coil operably attached to the one of the lens holder and the stationary part that is operably attached to the tracking coil, the focusing coil being configured to conduct a current substantially perpendicular to both the optical axis and the direction of polarization of the magnet,
   wherein the magnetic field is produced by the magnet in relation to the current flowing through the focusing coil, such that the magnetic field is sufficient to move the lens holder in a direction parallel to the optical axis without the use of another magnet, thereby correcting a focusing error of the objective lens,
   the tracking coil and focusing coil being operably attached to the lens holder,
   wherein the focusing coil is wound around a portion of the lens holder surrounding the rotation axis.

11. An objective lens driving apparatus comprising:
   a lens holder configured to hold an objective lens, the lens holder being operable to move in a direction parallel to an optical axis of the objective lens, and to rotate about a rotation axis;
   a stationary part configured to support the lens holder;
   a tracking coil operably attached to one of the lens holder and the stationary part, the tracking coil being configured to conduct a current flowing substantially parallel to said optical axis;
   a magnet operably attached to the one of the lens holder and the stationary part not operably attached to the tracking coil, the magnet being polarized in a single direction to produce a magnetic field in relation to the current flowing through the tracking coil, such that the magnetic field is sufficient to rotate the lens holder about the rotation axis without the use of another magnet, thereby correcting a tracking error of the objective lens; and
   a focusing coil operably attached to the one of the lens holder and the stationary part that is operably attached to the tracking coil, the focusing coil being configured to conduct a current substantially perpendicular to both the optical axis and the direction of polarization of the magnet,
   wherein the magnetic field is produced by the magnet in relation to the current flowing through the focusing coil, such that the magnetic field is sufficient to move the lens holder in a direction parallel to the optical axis without the use of another magnet, thereby correcting a focusing error of the objective lens,
   wherein the tracking coil and at least a portion of the focusing coil are operably attached to the lens holder on an opposite side than the objective lens, with respect to the rotation axis.

* * * * *